D. K. WILSON.
MANURE SPREADER.
APPLICATION FILED AUG. 14, 1908.
933,515.
Patented Sept. 7, 1909.
2 SHEETS—SHEET 1.
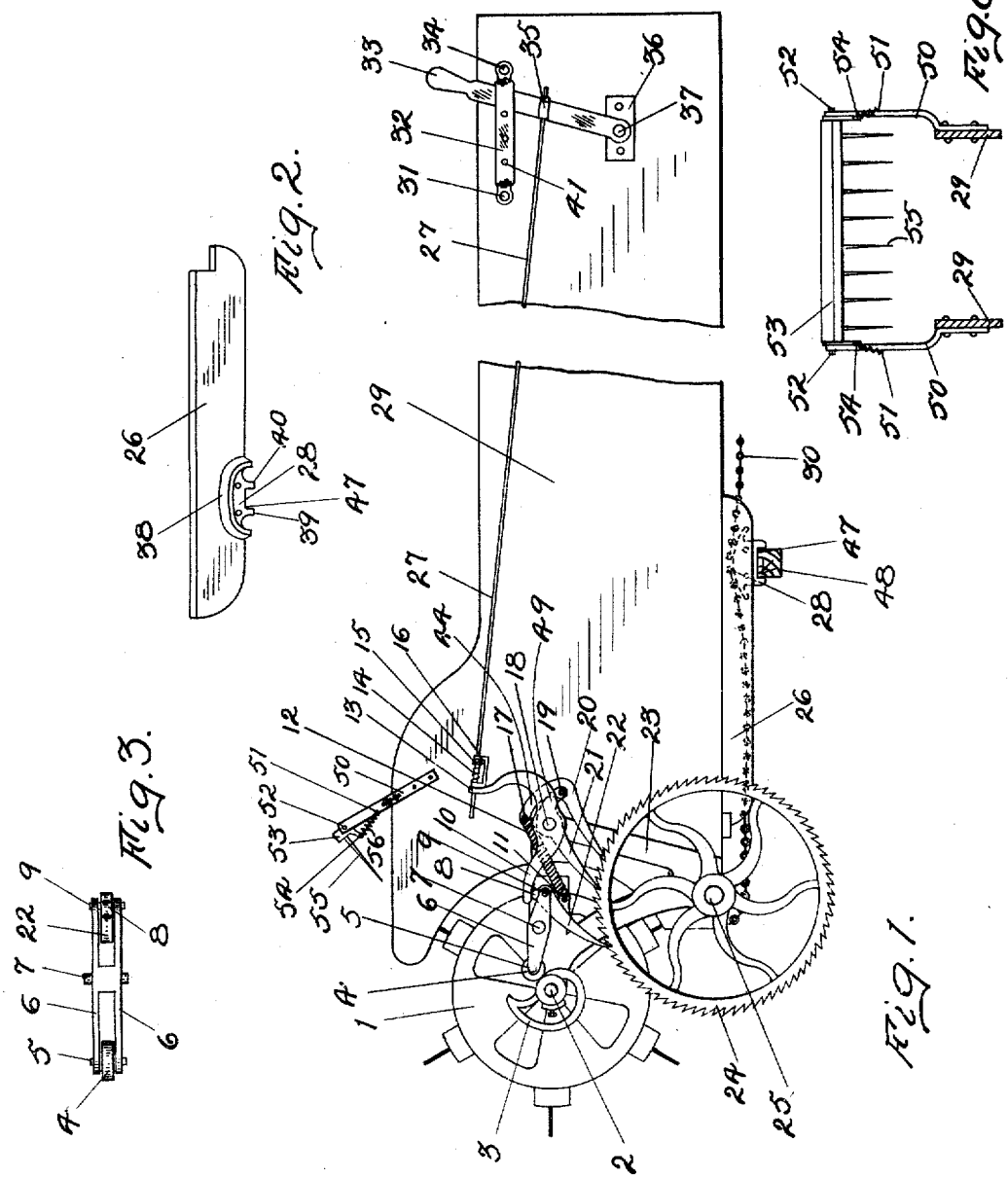
WITNESSES:
H. B. Burr.
Ila Haydank.
INVENTOR
Dalton K. Wilson
BY
G. C. Kennedy.
ATTORNEY

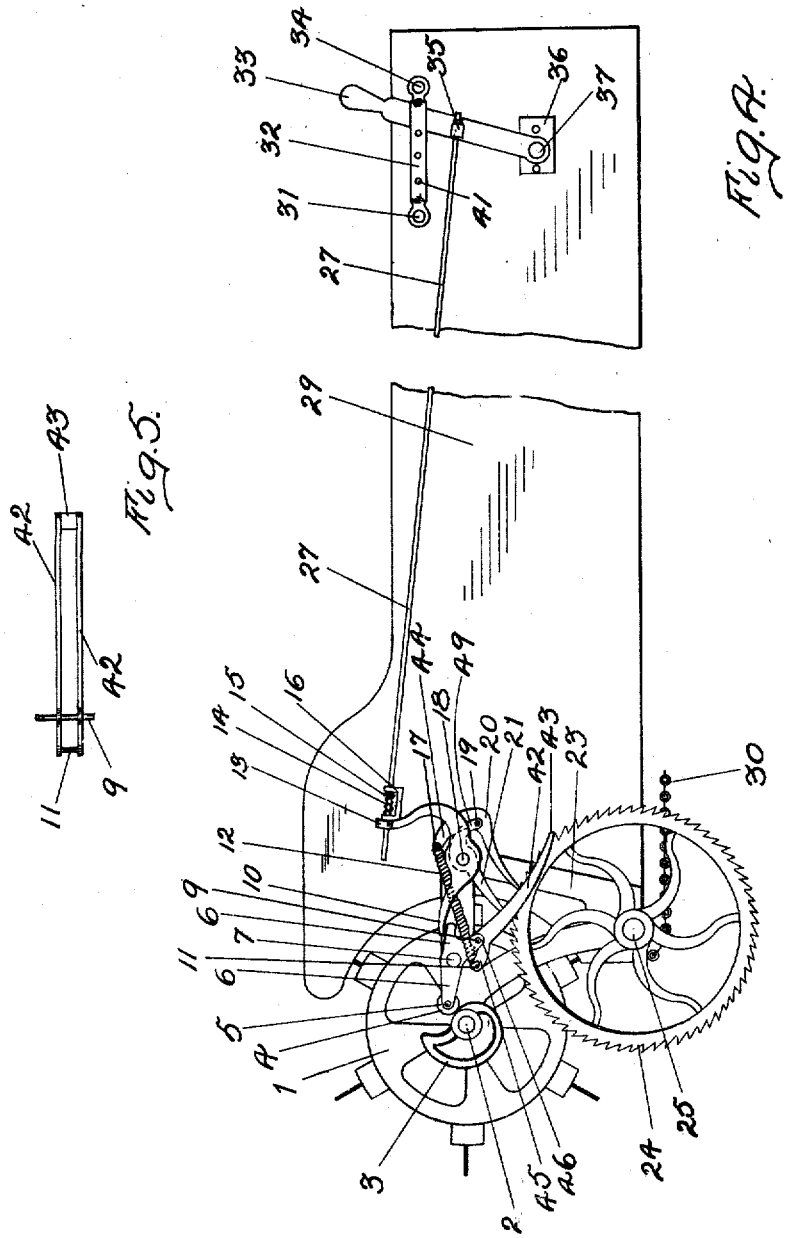

UNITED STATES PATENT OFFICE.

DALTON K. WILSON, OF WATERLOO, IOWA, ASSIGNOR TO WILLIAM GALLOWAY COMPANY, OF WATERLOO, IOWA.

MANURE-SPREADER.

933,515.  Specification of Letters Patent.  Patented Sept. 7, 1909.

Application filed August 14, 1908. Serial No. 448,549.

*To all whom it may concern:*

Be it known that I, DALTON K. WILSON, a citizen of the United States of America, and a resident of Waterloo, Blackhawk county, Iowa, have invented certain new and useful Improvements in Manure - Spreaders, of which the following is a specification.

My invention relates to improvements in manure spreaders, and the objects of my improvements are these: first, to provide an improved driving-mechanism for the conveyer-apron, adapted for adjustment to vary the speed of the apron; second, to furnish spacing-brackets between the box and bolsters with apron-guides integral therewith, and third, to provide more space between the comb supports. These objects I have accomplished by the means hereinafter described and claimed, and which are illustrated in the accompanying drawings, in which:

Figure 1 is a side elevation of the right-hand side of a manure spreader wagon-box equipped with my said improvements; Fig. 2 is a detail view of the spacing-means between said wagon-box and its bolsters; Fig. 3 is an upper plan view of the driving-pawl-carrying lever; Fig. 4 is a side elevation of a manure spreader wagon-box equipped with a slightly modified form of my improved adjustable pawl-and-ratchet driving-mechanism for the conveyer-apron. Fig. 5 is an upper plan view of the pulling-pawl 42 shown in Fig. 4, and Fig. 6 is an elevation of the comb-frame with its widely-spaced supports.

Similar numbers refer to similar parts throughout the several views.

The wagon-box 29 contains a movable conveyer-apron 30, and has at its open delivery-end a distributing-drum 1 secured to a transverse shaft 2 whose ends are rotatably mounted in bearings in brackets 23 fixed to said box. The conveyer-apron 30 is actuated by a transverse shaft 25, having a ratchet-wheel secured on its right-hand end. A cam-wheel 3 is secured to the right-hand end of the shaft 2. A lever 6 is medially pivoted on a stud 7 extending from the bracket 23. This lever, shown in plan in Fig. 3, is bifurcated at each side of its pivotal mounting, an anti-friction roller 4 being mounted in the rear bifurcation on pintles 5, and adapted to operatively contact with the working edge of the cam-wheel 3. The upper end of the driving-pawl 22 is mounted in the forward bifurcation of said lever on pintles 9, and its lower end is adapted to operatively contact with the teeth of the ratchet-wheel 24. Pivotally mounted on a stud 18 also extending from the bracket 23, is a lever having peculiarly-curved members 10 and 13, which however are directed substantially at right angles to each other, the member 10 extending backward into the path of travel of the forward member of the lever 6, while the member 13 has an orifice extending through its upper end from front to rear to receive slidably therethrough the rear portion of the rod 27.

A split-key 15 secured to the rod 27 a short distance anterior to the member 13, and a slide 16 having its upwardly directed members slidable on said rod incloses not only said split-key but also a coiled tension spring 14 between one of its members and said split-key. The forward end of the rod 27 is swiveled at 35 to a hand-lever 33, the lower end of the latter being pivoted on a stud 37 projecting from the plate 36 secured to the side of the wagon-box 29. The hand-lever 33 rocks in a rack-bar 32, which is secured by bolts 31 and 34 to the side 29, and may be secured by engaging means inserted into the holes 41. When the hand-lever 33 is shifted back, it causes a rearward movement of the rod 27. The slide 16 is thus caused to resiliently contact with the upper member 13, through the medium of the inclosed split-key 15 and spring 14, and induce the member 10 to move a determined distance into the path of movement of the lever 6. The resilient connection prevents any jar or breakage of said parts when the lever 33 is quickly shifted, as the spring gives enough to make the adjustment sufficiently gradual. According as the member 10 is pushed a greater or less distance into the path of movement of the lever 6, the driving-pawl 22 will click back over a different number of teeth of the ratchet-wheel 24, and thus the speed of movement of the apron 30 may be enhanced or retarded.

The numeral 8 designates a boss on the upper end of the pawl 22 above its pivot which is adapted to contact with the member 10 operatively in the adjustment above described.

I have shown herein two holding-pawls, 20 and 21, located as shown with 20 in advance of 21 but the pawl 20 being hung with reference to the pawl 21 so that when one of them has its point at the root of the ratchet-teeth, the point of the other is located about one-half of the length of a tooth away from the root of the contacting teeth. This arrangement results in one or the other holding-pawls being in close contact with the ratchet-wheel constantly. I have shown a device for holding both the driving- and holding-pawls resiliently down so as to always be in contact with said ratchet-wheel and click back thereover. The rear holding-pawl 21 is pivoted on the stud 18 and has a forwardly-directed member 49, the latter having a pivotal connection with the holding-pawl 20, such connection being the fulcrum of the latter. The holding-pawl 20 has a rearwardly-directed projection 44 with a connection 17 to the forward end of a coiled spring 12, the rear end of the latter having a connection 11 with the driving-pawl 22 at a point a little below its pivot 9. This spring 12 being obliquely-directed in the line of throw of the said driving-pawl tends to keep it in contact with the ratchet-wheel to click back thereover, while it also draws upwardly a little upon the forward member of the lever 6, keeping the latter balanced, also keeping the roller 4 in contact with the cam-wheel 3. The spring also keeps both of the holding-pawls in contact with said ratchet-wheel to click back thereover, but varying their contact therewith as above described by reason of the movement imparted by the pawl 22. As the driving-pawl 22 is pushed down, the spring 12 draws upon and moves the member 44 of the pawl 20 rearwardly pushing the point of the latter into full engagement with the periphery of said ratchet-wheel. The member 49 of the pawl 21 is thereby lifted by reason of its connection with the pawl 20, and thus the point of the pawl 21 is pushed down upon the periphery of said ratchet-wheel. Since from the method of mounting the said holding-pawls are alternately one-half the length of a tooth ahead of each other, one or the other of them is always sure to be in practical holding engagement with the teeth of the ratchet-wheel. Since ratchet-wheels formed of malleable iron are often somewhat distorted from the form of a perfect circle in their circumferential teeth, becoming slightly elliptical in form, this arrangement of two holding-pawls as described insures of one or the other engaging the root of teeth on said wheel.

I have adopted spacing-means for the wagon-box 29, whereby such box may be detachably connected to bolsters of different running-gear in succession. The spacing device consists of a hanger 26 secured to each side of the box underneath, such hangers having brackets 28 on their inner sides secured by bolts or other means. The upper surfaces 38 of said brackets are curved downwardly, and are adapted to be used as slideways for the ends of the conveyer-apron and supports therefor. The lower part of each bracket is formed with downwardly-projecting lugs 39 and 40, having therebetween a socket 47 of rectangular form but open at the bottom to fit over a bolster 48 removably. The same spacing device may be used for one or both axles and their bolsters, and enables the user to quickly remove or change the box from one set of running gears to the other when desired, as well as to adapt the mechanism of the spreader for use with such gears where different vertical adjustment can be had and is necessary by using bolsters of different heights.

The device shown in Figs. 4 and 5 is substantially the same in its driving-mechanism for the conveyer-apron as that shown in the other figures. A variation is made, however, in the lever 6, in that it has a stud instead of the driving-pawl to contact with the member 10. The driving-pawl 42 is formed to be a pulling instead of a pushing pawl, by directing it forward, and having its point 43 directed backward. The pawl 42 is longitudinally slotted to permit the holding-pawls 20 and 21 to work through it, while the rear end of the spring 12 is connected to the projection 45 thereof above the pivot 9, so as to keep said pawl in contact with the ratchet-wheel.

The comb 53—55 whose pintles 52 are pivoted in the ends of supports 50, overhangs the drum 1, and has a spring connection 56 at each end, from lugs 54 to the points 54. The supports 50 are spread outwardly from the tops of the sides 29, to prevent any clogging of overhanging parts of the load in passing by them, as shown in Fig. 6.

Having described my invention, what I claim as new, and desire to secure by Letters Patent, is:

1. In a manure spreader, in combination, a wagon-box, a movable apron therein, a pivoted lever, means for reciprocating said pivoted lever, a ratchet-wheel adapted to actuate said apron, a driving-pawl pivoted to said lever and adapted to engage and drive said ratchet-wheel, a holding-pawl pivoted to said box, and provided with a projecting member, a second holding-pawl pivotally connected to the projecting-member on the first-mentioned holding-pawl, and resilient connecting-means between said driving-pawl and the said second holding-pawl, adapted to keep said driving-pawl and both holding-pawls in engagement with said ratchet-wheel to click back thereover, the holding-end of one holding-pawl being adapted to be in full engagement with the root of teeth on said ratchet-wheel when the holding-end of the other holding-pawl is spaced away from the root of teeth on said wheel to a distance approximately one-half the length of a tooth thereof.

2. In a manure spreader, in combination, a wagon-box, a movable apron therein, a pivoted lever, a rotatable shaft, a cam-wheel on said shaft adapted to contact with and actuate said pivoted lever, a ratchet-wheel adapted to actuate said apron, a driving-pawl pivoted to said lever and adapted to engage and drive said ratchet-wheel, a holding-pawl pivoted to said box, and provided with a projecting member, a second holding-pawl pivotally connected to the projecting member on the first-mentioned holding-pawl, and resilient connecting-means between said driving-pawl and the second holding-pawl, adapted to keep said driving-pawl and both holding-pawls in engagement with said ratchet-wheel to click back thereover, the holding-end of one holding-pawl being adapted to be in full engagement with the root of teeth on said ratchet-wheel when the holding-end of the other holding-pawl is spaced away from the root of teeth on said wheel to a distance approximately one-half the length of a tooth thereof.

3. In a manure spreader, in combination, a wagon-box, a movable apron therein, a pivoted lever, means for reciprocating said pivoted lever, a ratchet-wheel adapted to actuate said apron, a driving-pawl pivoted to said lever and adapted to engage and drive said ratchet-wheel, a holding-pawl pivoted to said box, and provided with a projecting member, a second holding-pawl pivotally connected to the projecting member on the first-mentioned holding-pawl, resilient connecting-means between said driving-pawl and the said second holding-pawl, adapted to keep said driving-pawl and both holding-pawls in engagement with said ratchet-wheel to click back thereover, the holding-end of one holding-pawl being adapted to be in full engagement with the root of teeth on said ratchet-wheel when the holding-end of the other holding-pawl is spaced away from the root of teeth on said wheel to a distance approximately one-half the length of a tooth thereof, a bell-crank lever pivoted to said box, one member of said lever adapted to be interposed in the path of travel of said first-mentioned pivoted lever, the other member being orificed to slidably receive a connecting-rod, a hand-lever pivoted to said box, and a connecting-rod swiveled to said hand-lever and having a slidable resilient device connected thereto adapted to be contacted by the orificed member of said bell-crank lever, the free end of said connecting-rod being adapted to slide within the orifice in said orificed member.

4. In a manure spreader, in combination, a wagon-box, a movable apron therein, a pivoted lever, a rotatable shaft, a cam-wheel on said shaft adapted to contact with and actuate said pivoted lever, a ratchet-wheel adapted to actuate said apron, a driving-pawl pivoted to said lever and adapted to engage and drive said ratchet-wheel, a holding-pawl pivoted to said box, and provided with a projecting member, a second holding-pawl pivotally connected to the projecting-member on the first-mentioned holding-pawl, and resilient connecting-means between said driving-pawl and the said second holding-pawl, adapted to keep said driving-pawl and both holding-pawls in engagement with said ratchet-wheel to click back thereover, the holding-end of one holding-pawl being adapted to be in full engagement with the root of teeth on said ratchet-wheel when the holding-end of the other holding-pawl is spaced away from the root of teeth on said wheel to a distance approximately one-half the length of a tooth thereof, a bell-crank lever pivoted to said box, one member of said lever adapted to be interposed in the path of travel of said first-mentioned pivoted lever, the other member being orificed to slidably receive a connecting-rod, a hand-lever pivoted to said box, and a connecting-rod swiveled to said hand-lever and having engaging means thereon adapted to be contacted by the orificed member of said bell-crank lever, the free end of said connecting-rod being adapted to slide within the orifice in said orificed member.

5. In a manure spreader, in combination, a wagon-box, a movable apron therein, a ratchet-wheel operatively connected to said movable apron, a pivoted lever, means for reciprocating said pivoted lever, a longitudinally-slotted pulling-pawl pivoted to said pivoted lever and adapted to drive said ratchet-wheel, a holding-pawl pivoted to said box, said pawl provided with a projection, and engaging said ratchet-wheel, a second holding-pawl pivoted to the projection on the first-mentioned holding-pawl and engaging said ratchet-wheel, both said holding-pawls working through the slot in said driving-pawl in engaging the ratchet-wheel, a resilient-connection between said pulling-pawl and said second holding-pawl adapted to keep all the pawls in contact with said ratchet-wheel to click back thereover, and one holding-pawl adapted to be spaced one-half the length of a tooth away from the roots of teeth of the ratchet-wheel when the other holding-pawl is in engagement with the roots of teeth on said wheel.

6. In a manure spreader, in combination, a wagon-box, a movable apron therein, a ratchet-wheel operatively connected to said movable apron, a pivoted lever, means for reciprocating said pivoted lever, a longitudinally-slotted pulling-pawl pivoted to said pivoted lever and adapted to drive said ratchet-wheel, a holding-pawl pivoted to said box, said pawl provided with a projection, and engaging said ratchet-wheel, a second holding-pawl pivoted to the projection on the first-mentioned holding-pawl and engaging said ratchet-wheel, both said holding-pawls working through the slot in said driving-pawl in engaging the ratchet-wheel, a resilient-connection between said pulling-pawl and said second holding-pawl adapted to keep all the pawls in contact with said ratchet-wheel to click back thereover, one holding-pawl adapted to be spaced one-half the length of a tooth away from the roots of teeth of the ratchet-wheel when the other holding-pawl is in engagement with the roots of teeth on said wheel, and adjusting-means adapted to be interposed in the path of travel of the first-mentioned pivoted lever to vary the scope of its movement and the scope of driving movement of said pulling-pawl.

7. In a manure spreader, in combination, a wagon-box, means in said box adapted to move a load therein toward the delivery-end, a rotatable-distributer located at the delivery-end of said box, a transverse comb mounted over the said delivery-end in upright supports, the said comb-supports being offset outwardly to afford a wider clearance space between them above the box-sides than the transverse distance between the outer faces of said box-sides below said comb.

Signed at Waterloo, Iowa, this 27th day of July, 1908.

DALTON K. WILSON.

Witnesses:
G. C. KENNEDY,
O. D. YOUNG.